US009997767B2

(12) United States Patent
Ogg et al.

(10) Patent No.: US 9,997,767 B2
(45) Date of Patent: *Jun. 12, 2018

(54) ACCELERATED FORMATION AND INCREASED PERFORMANCE IN CHEMICALLY PRE-FORMED (CPF) IRON NEGATIVE ELECTRODES

(71) Applicant: Encell Technology, Inc., Alachua, FL (US)

(72) Inventors: Randy Gene Ogg, Newberry, FL (US); Michael Roders, Gainesville, FL (US); Michael Meese, Gainesville, FL (US)

(73) Assignee: ENCELL TECHNOLOGY, INC., Alachua, FL (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/478,843

(22) Filed: Sep. 5, 2014

(65) Prior Publication Data
US 2015/0064561 A1    Mar. 5, 2015

Related U.S. Application Data

(60) Provisional application No. 61/874,177, filed on Sep. 5, 2013.

(51) Int. Cl.
H01M 4/04 (2006.01)
H01M 4/38 (2006.01)
H01M 4/26 (2006.01)
H01M 4/24 (2006.01)
H01M 4/58 (2010.01)

(52) U.S. Cl.
CPC .......... *H01M 4/049* (2013.01); *H01M 4/248* (2013.01); *H01M 4/26* (2013.01); *H01M 4/38* (2013.01); *H01M 4/5815* (2013.01)

(58) Field of Classification Search
CPC .......... H01M 4/049; H01M 4/38; H01M 4/26; H01M 4/248; H01M 4/5815
See application file for complete search history.

(56) References Cited

U.S. PATENT DOCUMENTS 3,507,696 A * 4/1970 Langer .................... H01M 4/52
                                                     429/206
3,679,482 A    7/1972 Hardman
3,836,397 A * 9/1974 Hardman .............. H01M 4/248
                                                     429/206

(Continued)

OTHER PUBLICATIONS

International Search Report from corresponding Application No. PCTUS2014/54378 dated Dec. 8, 2014.

(Continued)

*Primary Examiner* — Peter F Godenschwager
*Assistant Examiner* — Andrew J. Oyer
(74) *Attorney, Agent, or Firm* — E. Joseph Gess; Melissa M. Hayworth

(57) ABSTRACT

Provided is a process for preparing an electrode comprising an iron active material. The process comprises first fabricating an electrode comprising an iron active material, and then treating the surface of the electrode with an oxidant to thereby create an oxidized surface. The resulting iron electrode is preconditioned prior to any charge-discharge cycle to have the assessable surface of the iron active material in the same oxidation state as in discharged iron negative electrodes active material.

8 Claims, 2 Drawing Sheets

(56) References Cited

U.S. PATENT DOCUMENTS

| | | | |
|---|---|---|---|
| 3,898,098 A * | 8/1975 | Giles | H01M 4/52 |
| | | | 205/66 |
| 4,500,406 A | 2/1985 | Weyand et al. | |
| 4,746,907 A | 5/1988 | Zehnder, Jr. | |
| 4,792,505 A * | 12/1988 | Moyes | H01M 4/34 |
| | | | 429/219 |
| 5,480,744 A | 1/1996 | Bal | |
| 5,580,679 A * | 12/1996 | Tanaka | H01M 2/08 |
| | | | 429/171 |
| 5,746,907 A | 5/1998 | Wielers et al. | |
| 5,905,000 A | 5/1999 | Yadav et al. | |
| 6,143,126 A | 11/2000 | Stevens | |
| 2004/0086784 A1 | 5/2004 | Barker et al. | |
| 2005/0271575 A1 | 12/2005 | Ciampi | |
| 2009/0061303 A1 * | 3/2009 | Inagaki | H01M 4/485 |
| | | | 429/163 |
| 2013/0149615 A1 | 6/2013 | Narayan et al. | |
| 2015/0060739 A1 | 3/2015 | Ogg | |
| 2015/0060740 A1 | 3/2015 | Ogg | |
| 2015/0064562 A1 | 3/2015 | Ogg | |

OTHER PUBLICATIONS

Manohar et. al. in "Understanding the factors affecting the formation of Carbonyl Iron Electrodes in Rechargeable Alkaline Iron Batteries", J. Electrochem. Soc., 159, 12, (2012) A 2148-2155.
http://www.organic-chemistry.org/chemicals/oxidations.
International Preliminary Report on Patentability from corresponding Application No. PCTUS2014/54378 dated Mar. 8, 2016.
Written Opinion of the International Searching Authority from corresponding Application No. PCTUS2014/54378 dated Dec. 8, 2014.

* cited by examiner

ACCELERATED FORMATION AND INCREASED PERFORMANCE IN CHEMICALLY PRE-FORMED (CPF) IRON NEGATIVE ELECTRODES

RELATED APPLICATION

The present application claims priority to provisional application U.S. 61/874,177 filed on Sep. 5, 2013, which is incorporated herein by reference in its entirety.

BACKGROUND OF THE INVENTION

Field of Invention

The present invention is in the technical field of energy storage devices. More particularly, the present invention is in the technical field of an electrode comprising an iron active material.

Related Art

Rechargeable batteries often require several charge-discharge cycles prior to achieving optimum performance. During these early cycles, critical surface films are formed on the electrode surfaces that affect the performance of the cell during later cycling. These early cycles are commonly termed formation cycles in the battery industry. In the case of nickel-iron batteries (Ni—Fe), 30 to 60 formation cycles are typically needed to achieve the full capacity of the cell. Formation cycling sometimes requires cycling at varied temperature regimes which complicates the process. This formation process is expensive, time consuming, consumes electrolyte which needs replacing, and generates a significant amount of gas. Therefore, reducing the number of formation cycles and simplifying the formation process is a worthy goal.

Manohar et. al. in "Understanding the factors affecting the formation of Carbonyl Iron Electrodes in Rechargeable Alkaline Iron Batteries", J. Electrochem. Soc., 159, 12, (2012) A 2148-2155, reported that one reason for the long formation time could also be the poor wettability of the iron electrode and the inaccessibility of the pores of the iron by the electrolyte. As the pores became more accessible the charge and discharge process produced a progressively rougher surface resulting in an increase in electrochemically active surface area and discharge capacity. Triton X-100, a surfactant, reduced the number of cycles required to achieve higher capacity presumably because it improved access of the electrolyte to the pores.

U.S. Pat. No. 3,507,696 teaches that a mixture of FeO and $Fe_2O_3$ powders fused with sulfur at 120° C. yields an active material that may be used in an aqueous slurry to impregnate sintered nickel fiber plaques that can used as a negative electrode in a Ni—Fe battery. Several formation cycles are needed to achieve high capacity.

It would be of benefit to the industry to have an iron electrode which is conditioned prior to any charge-discharge cycle so as to minimize the need for formation cycles.

SUMMARY OF THE INVENTION

Provided is a process for preparing an electrode comprising an iron active material, which comprises:
i) fabricating an electrode comprising an iron active material, and
ii) treating the surface of the electrode with an oxidant to thereby create an oxidized surface.

In one embodiment, the oxidant comprises water, hydrogen peroxide, ozone, chlorine, nitric acid, hypochlorite, nitrous oxide, bromine, iodine, permanganate compounds, or sodium perborate.

In another embodiment, provided is an electrode which comprises an iron active material, which electrode has been preconditioned prior to any charge-discharge cycle to have the accessible surface of the iron material in the same oxidation state as the discharged iron negative electrode active material. In one embodiment, the oxidation state of the conditioned iron active material is +2, +2/+3, +3 or +4.

Among other factors, the present invention provides a process and resulting iron electrode which addresses the mismatch in the state-of-charge (SOC) of the anode and cathode that is present during Ni—Fe cell assembly. Use of the present iron electrode decreases the number of cycles, and time to achieve cell formation, electrolyte consumption, hydrogen gas generated, and the amount of water needed to refill the cell. In general, the use leads to improved iron utilization in the cell.

DETAILED DESCRIPTION OF THE PREFERRED EMBODIMENTS

Figure 1:
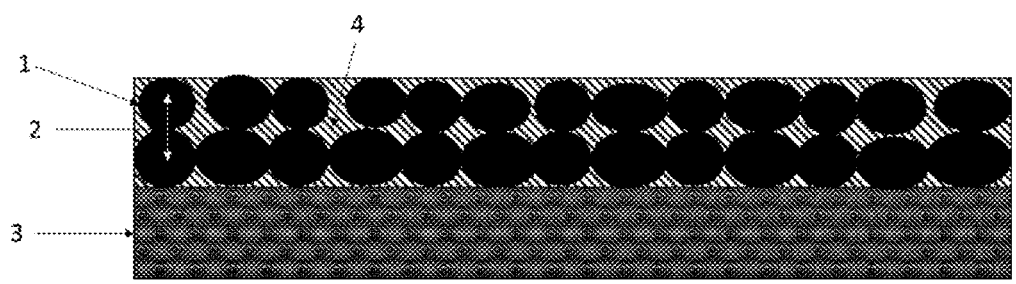
FIG. 1 is an illustration of the interparticle contact between active material particles and the space between particles or pores that can be filled with oxidizing solution to precondition the surface of the electrode particles.

Provided by the present invention is a chemically preconditioned iron electrode and a method for its preparation. The present invention chemically treats an iron metal electrode after the electrode is assembled to provide a preconditioned iron electrode. It is expected that the process of the present invention is amenable to a continuous process, and is therefore simpler and of lower cost than existent processes.

The preconditioned electrode may be prepared from a standard iron electrode used in Ni—Fe cells. These iron electrodes can be comprised of iron particles or mixtures thereof with sulfur, nickel, or other metal powders, bonded to a substrate. In one embodiment, a conductive additive for the iron electrode comprises nickel, carbon black or copper. In one embodiment, an additive of the iron electrode comprises sulfur. In another embodiment, the coating of active material of the iron electrode comprises a binder for the iron or iron active material, and additives. The binder is generally a polymer such as PVA, or a rubber. The use of a PVA binder has been found to be quite beneficial and advantageous.

In one embodiment, the iron electrode comprises about 50-90 wt % iron powder, and in another embodiment from about 75-85 wt % iron powder; from about 5-30 wt % nickel powder, and in another embodiment from about 12-20 wt % nickel powder; from 0.5-5.0 wt % binder, and in another embodiment from about 2.0-5.0 wt % binder; and, from 0.25-2.0 wt % sulfur, and in another embodiment, from about 0.25-1.0 wt % sulfur. In one embodiment, the iron electrode comprises about 80 wt % iron powder, about 16 wt % nickel powder, about 3.5 wt % binder and about 0.5 wt % sulfur powder.

In one embodiment, the iron electrode can comprise additional conventional additives, such as pore formers. In general, the porosity of the iron electrode is in the range of from 15-50%, and in one embodiment from 35-45%.

The substrate used in the electrode can be comprised of a conductive material such as carbon or metal. The substrate for the iron electrode is generally a single layer of a conductive substrate coated on at least one side with a coating comprising the iron active material. Both sides of the substrate can be coated. In one embodiment, the coating on at least one side comprises iron and additives comprised of sulfur, antimony, selenium, tellurium, nickel, bismuth, tin, or a mixture thereof. The substrate is generally a metal foil, metal sheet, metal foam, metal mesh, woven metal or expanded metal. In one embodiment, the substrate for the iron electrode is comprised of a nickel plated steel. It is generally of porous construction such as that provided by a mesh, or grid of fibrous strands, or a perforated metal sheet. The iron electrode can also be sintered.

The iron electrodes of the present invention are chemically preconditioned with oxidants that are able to oxidize the iron surface. These materials include but are not limited to: water, hydrogen peroxide, ozone, chlorine, nitric acid, hypochlorite, nitrous oxide, bromine, iodine, permanganate compounds, and sodium perborate. Oxidizing materials that are non-toxic and volatile and yield reduction or thermal decomposition products that are also non-toxic and volatile are preferred. Preferred oxidants are water and hydrogen peroxide. Water and solutions used to pretreat the iron electrodes may or may not contain a surfactant. An example of a surfactant that may be used includes but is not limited to Triton X-100. The treatment of the electrodes may be accomplished by coating, dipping, spraying, or otherwise applying oxidants or solutions containing the oxidant to the electrode. The electrode may also be preconditioned by exposing the electrode to an oxidizing gas.

The length of time the electrodes are treated can vary, but is generally until oxidation of the iron on the accessible surface of the electrode is observed. The temperature at which the treatment is made is generally ambient, but it can be at higher temperatures, eg., in an oven. After the treatment, the electrode is dried. It can be air dried or in an oven, for example.

In one embodiment, the treatment of the iron electrode is continued until the accessible surface of the iron material of the electrode is in the same oxidation state as the electrode would in the discharged state. This is achieved by the oxidation treatment and can be determined using conventional methods available.

While not wishing to be bound by theory, it is believed that nickel-iron batteries may sometimes be assembled with the nickel cathode (positive electrode) in its discharged state and the iron anode (negative electrode) in its charged state. Thus, when the cell is assembled there is a mismatch between the state-of-charge (SOC) between the anode and cathode which is corrected during the formation process. During the formation process, it is believed that the low capacity of the early cycles is due to the limited amount of discharge products (ie. $Fe(OH)_2$, $Fe(OH)_3$, and $Fe_3O_4$ depending on depth of discharge) that are formed until the proper conductivity, texture, and porosity of the iron electrode is achieved. Consequently, the negative electrode is in a higher SOC than the positive electrode for most of the formation process.

During the charge of a Ni—Fe cell there are typically two processes that occur at the anode surface, which are shown in Equations 1 and 2 below. Equation 1 is the desired conversion of discharge product, $Fe(OH)_2$, to iron metal. Equation 2 is the reduction of water to hydroxide and hydrogen gas. The two processes have very similar electrochemical potentials and both are usually active during the charge process.

$$Fe(OH)_2 + 2e^- \rightarrow Fe + 2OH^- \quad E° = -0.877 \text{ V} \qquad 1$$

$$2H_2O + 2e^- \rightarrow H_2 + 2OH^- \quad E° = -0.828 \text{ V} \qquad 2$$

However, when the negative electrode is at high SOC as in formation, the reaction in Equation 2 is more dominant since there is too little $Fe(OH)_2$ or other iron compounds with iron in its +2 or +3 oxidation state to accept current from the cathode. The reaction in Equation 2 consumes the water in the electrolyte which needs to be replaced and generates significant amount of gas that can become trapped between the electrodes, further hindering desired electrochemical reactions at the electrode surfaces. Gas generation can cause loss of adhesion of the active material to the electrode further damaging the electrode.

It is believed that chemically pretreating the electrode with oxidants in accordance with the present invention converts areas of the electrode that are accessible by the alkaline electrolyte, including pores, to iron hydroxides and/or iron oxides that are capable of being reduced to iron metal when an electrochemical current is applied in a cell. The products of the pretreating of the iron electrode may be the same as the discharge products on the iron electrode, or may be different. These products may comprise independently or as a mixture: $Fe(OH)_2$, $Fe(OH)_3$, $Fe_3O_4$, $Fe_2O_3$, FeO, and other iron oxides. As a result, the mismatch in the SOC of the anode and cathode that is present during Ni—Fe cell assembly is minimized, if not avoided all together. Use of the present iron electrode thereby decreases the number of cycles and time to achieve cell formation, electrolyte consumption, hydrogen gas generated, and the amount of water needed to refill the cell.

FIG. 1 shows a diagram of an electrode that has been preconditioned. The iron particle active material, 1, retains interparticle contact, 2, and electrical contact between the active materials and the substrate, 3, is maintained. The surface of the electrode and the pores, 4, are able to be contacted by the oxidant for preconditioning. Areas where there is interparticle contact are not oxidized. Because the oxidation products are electrically insulating, it is an advantage of this invention that the areas where there is interparticle contact are not oxidized, maintaining a conductive network between particles.

The present example is provided to further illustrate the present invention. It is not meant to be limiting.

EXAMPLE

Figure 2:
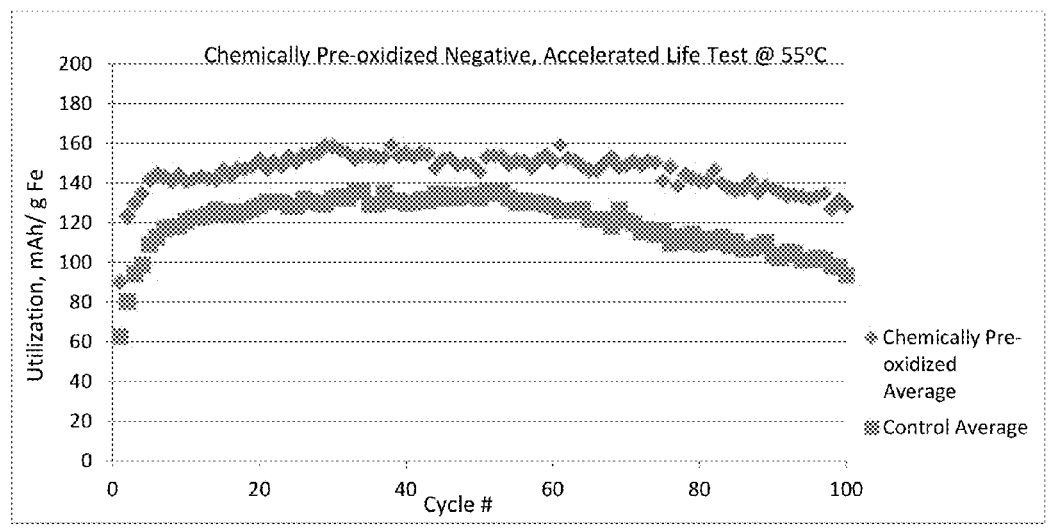
FIG. 2 shows the capacity of Ni—Fe cells with and without preconditioned iron electrodes.

An aqueous slurry consisting of 80% iron, 16% nickel, and 0.5% sulfur powders with 3.5% polyvinyl alcohol binder were pasted onto a perforated nickel sheet which was then dried. This sheet was then chemically preconditioned by brushing with deionized water and allowed to dry in air for 16 hours at room temperature followed by drying in an oven at 190° C. for 15 minutes. A 16% weight gain was measured and a slight orange-brown color was observed on the surface of the electrode. Two sample electrodes were cut from this sheet and tabs were TIG welded to the top uncoated area of the electrode. Two sample cells were constructed using these negative electrodes by placing the negative electrode between two commercial Histar sintered positive nickel hydroxide electrodes. Both the positive and negative electrodes were pocketed into polypropylene separator. For comparison, two identical cells were constructed from identical materials except that the negative electrodes were not chemically preconditioned. The test cells containing CPF iron negative electrodes and the control cells were subjected to an accelerate life test at 55° C. with the following charge regime:

Cycle 1 (@Room Temp):
    Charge: 1.0 A×1.5 hrs
    Rest: 30 Min
    Discharge: 0.1 A to 1.0 V
    Rest: 30 Min
Cycle 2-100 (@55° C.):
    Charge: 1.0 A×1.5 hrs
    Rest: 30 Min
    Discharge: 0.1 A to 1.0 V
    Rest: 30 Min The cycling characteristics for cells prepared with pre-conditioned iron electrodes is shown in FIG. 2. The cells with chemically pre-conditioned negative electrodes deliver a capacity of 140-160 mAh/g Fe after only five cycles compared to a capacity of 120-135 mAh/g Fe after ten cycles for cells with negative electrodes that were not preconditioned. Furthermore, the overall capacity for cells with preconditioned electrodes is between 17-19% higher for the life of the cell after formation demonstrating a further advantage of this invention.

While the foregoing written description of the invention enables one of ordinary skill to make and use what is considered presently to be the best mode thereof, those of ordinary skill will understand and appreciate the existence of variations, combination, and equivalents of the specific embodiment, method, and examples therein. The invention should therefore not be limited by the above described embodiment, method and examples, but by all embodiments and methods within the scope and spirit of the inventions and the claims appended therein.

What is claimed is:

1. An electrode which has not been subject to a charge-discharge cycle, comprising an iron active material, a polyvinyl alcohol binder and sulfur, which electrode surface has an oxidized iron surface and areas of interparticle contact that are in an oxidized state different from the oxidized iron surface, which electrode is prepared by a process comprising:
    i) fabricating an electrode comprising an iron active material, and
    ii) treating the surface of the electrode with an oxidant to thereby create an oxidized surface prior to the electrode being subjected to a charge-discharge cycle.

2. The electrode of claim 1, wherein the oxidation state of the oxidized iron surface is +2, +2/+3, +3 or +4.

3. The electrode of claim 1, wherein the electrode further comprises a conductive additive.

4. The electrode of claim 3, wherein the conductive additive comprises nickel, or copper or carbon black.

5. The electrode of claim 1, wherein the electrode comprises an iron active material comprising about:
    50-90 wt % iron powder
    5-30 wt % nickel powder
    0.5-5.0 wt % binder, and
    0.25-20 wt % sulfur.

6. The electrode of claim 1, wherein the electrode comprises a single layer of conductive substrate coated on at least one side with a coating comprising the iron active material.

7. The electrode of claim 6, wherein the substrate is comprised of nickel plated steel.

8. The electrode of claim 1, wherein the porosity of the electrode is in the range of about 15-50%.

* * * * *